United States Patent Office 2,804,440
Patented Aug. 27, 1957

2,804,440

ORGANOPOLYSILOXANE POLISHES

Donald V. Brown, Schenectady, N. Y., assignor to General Electric Company, a corporation of New York No Drawing. Application January 31, 1955, Serial No. 485,346

6 Claims. (Cl. 260—28)

This invention relates to protective coating compositions. More particlarly, it relates to liquid coating compositions for various surfaces which contain as essential ingredients a low viscosity liquid difunctional organopolysiloxane, a high viscosity liquid difunctional organopolysiloxane, and a resinous organopolysiloxane incompatible with the aforementioned low and high viscosity polymers.

The use of organopolysiloxanes in wax film-forming compositions for coating purposes has been found to promote the film characteristics especially in improving the ease of application and buffing to a glossy or shiny surface. In the polishing art, it has been found that although the organopolysiloxane is incompatible with wax generally used in polishes, nevertheless when combined with the wax and applied to a surface by means of a mutually miscible solvent, a coating is produced which is substantially easier to buff, and possesses a higher degree of gloss than films resulting from the application of conventional wax compositions from which the organopolysiloxane has been omitted.

Although such combinations of organopolysiloxanes in various wax-containing polishes have resulted in improvements in ease of application and ease of rub-out, nevertheless there has been much to be desired in the depth of color attained by the buffing action and in the ability of the polish in the finally buffed condition to cover scratches existing in the surface so that they are less obvious in appearance. Moreover, these polishes containing organopolysiloxanes in the formulation do not give the desirable surface protection under various weather conditions which have been expected of such compositions.

One of the objects of this invention is to improve the color depth of films deposited from surface-coating polishes and to reduce still further the degree of buffing or polishing required to attain a glossy film.

Another object of the invention is to obtain a drier, less smeary shine with fewer polishing strokes.

A still further object of the invention is to be able to better mask scratches existing on various surfaces being polished.

An additional object of the invention is to improve the surface protection afforded various surfaces by polishes so that they are more resistant for longer periods of time to weathering.

Additional objects of the invention will become apparent from the description thereof which follows.

I have now discovered that unexpectedly a polishing mixture containing a low viscosity liquid difunctional organopolysiloxane, a high viscosity liquid difunctional organopolysiloxane, and an organopolysiloxane resin incompatible with both the low and high viscosity organopolysiloxanes is able to impart to surfaces greater color depth, requires fewer polishing strokes to give a highly glossy surface, masks scratches better so that they are less apparent to the eye, and finally such compositions offer improved and longer surface protection to the elements.

The low viscosity liquid, linear, difunctional organopolysiloxanes (for brevity hereinafter referred to as "low viscosity silicone") cover triorganosiloxy end-blocked organopolysiloxanes (of an Si—O—Si skeletal structure) of the formula $R_{(2a+2)}Si_aO_{a-1}$ where R is a monovalent organic radical, e. g., a monovalent hydrocarbon radical (for example, methyl, ethyl, propyl, isopropyl, phenyl, tolyl, xylyl, benzyl, etc., radicals), or halogenated aryl radicals (e. g., chlorophenyl, trichlorophenyl, etc.), and $a$ is a whole number equal to at least three, each terminal silicon atom in the skeletal structure being joined to three R groups. An example of such a liquid is one having the formula

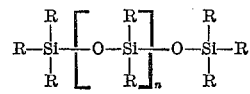

where R has the meaning above and $n$ is an integer greater than 1, for instance, from 20 to 400 or more. Compositions embraced by the above formulae are more particularly disclosed and claimed in Patnode Patent 2,469,888, issued May 10, 1949, which by reference is made part of the disclosures of the present application. These low viscosity silicones are required in the practice of the present invention to have viscosities between about 50 to 1000 centipoises, preferably from 100 to 500 centipoises. R may be the same or different hydrocarbon radicals and is preferably a lower alkyl radical, specifically a methyl radical.

The high viscosity liquid difunctional organopolysiloxanes (hereinafter for brevity referred to as "high viscosity silicone") employed in the practice of the present invention have the same formula as do the lower viscosity liquid difunctional organopolysiloxanes, except that the value for $n$ is greater (e. g., from 1000 to 10,000 or more) than the value of $n$ for the lower viscosity materials. In addition, these higher viscosity compositions are required to have viscosities of at least 5,000 and not more than 100,000 centipoises, preferably from 7,000 to 15,000 centipoises.

The incompatible organopolysiloxane resin is one which consists of silicon and oxygen atoms and hydrocarbon radicals attached to silicon by carbon-silicon linkages. It is essential that the resinous polymer be incompatible i. e., immiscible, with both the low viscosity and high viscosity liquid difunctional organopolysiloxane and that it have a ratio within the range of from 1.1 to 1.8 hydrocarbon groups per silicon atom. The hydrocarbon radicals attached to silicon may be, for instance, methyl, ethyl, phenyl, vinyl, as well as mixtures of methyl and phenyl radicals, mixtures of methyl and vinyl radicals, mixtures of methyl and ethyl radicals, mixtures of methyl, vinyl and phenyl radicals, etc. Examples of incompatible organopolysiloxane resins which may be used in the practice of the instant invention may be found disclosed in Rochow Patents 2,225,218–222 issued October 7, 1941, and assigned to the same assignee as the present invention. The resin is advantageously used in the form of a 10 to 90% solids solution in a solvent such as toluene, xylene, etc. These incompatible organopolysiloxane resins are generally obtained by hydrolyzing a mixture of ingredients containing both difunctional and trifunctional units of which, for example, dimethyldichlorosilane and diphenyldichlorosilane are examples of difunctional units and methyltrichlorosilane and phenyltrichlorosilane are examples of trifunctional units. Among such mixtures of hydrolysis products may be mentioned methyltrichlorosilane, dimethyldichlorosilane, either alone or in combination with other organochlorosilanes, for instance methyl phenylchlorosilanes, particularly phenyltrichlorosilane, diphenyldichlorosilane, methyl phenyldichlorosilane, ethyltrichlorosilane, as well as tetrafunctional materials such as silicon tetrachloride. The hydrolyzable organosilanes are chosen so that the organic-to-silicon ratio is within the 1.1 to 1.8 ratio mentioned above. Various techniques for hydrolysis may be employed as are well known in the art. After obtaining the hydrolysis product, the resin may, if desired, be bodied in the presence of body agents, such as potassium hydroxide, preferably under the influence of heat.

The determination as to whether the organopolysiloxane resin is incompatible with both the high and low viscosity difunctional silicone fluids can be made by mixing both the high and low viscosity silicone fluids with the organopolysiloxane, all in equal weight proportions, and determining whether a two-phase system separates out. If such a two-phase system is obtained and the organopolysiloxane resin otherwise satisfies the other requirements for the resin, it can be expected that the organopolysiloxane resin will be suitable in the preparation of the polish formulation to give the desired results. This incompatibility will generally exist even in the presence of solvents which might be considered as solvents for the high and low viscosity organopolysiloxanes and the organopolysiloxane resin. For instance, if one dissolves equal parts of the high and low viscosity organopolysiloxane fluids together with an equal part (i. e., equal to the weight of either fluid) of the organopolysiloxane resin in toluene equal in weight to the total weight of the organopolysiloxane ingredients and stirs the mixture, one will obtain a milky composition indicative of incompatibility of the resin with the other two organopolysiloxane ingredients. These tests for incompatibility or immiscibility can be readily carried out to determine the suitability of the organopolysiloxane resin in formulating the surface coating composition.

The proportion of the low viscosity liquid difunctional organopolysiloxane, high viscosity liquid difunctional organopolysiloxane and incompatible organopolysiloxane resin is advantageously kept within certain limits. On a weight basis, a preferred range of ingredients is as follows, although ranges outside these limits are not precluded:

| | Parts |
|---|---|
| Low viscosity liquid difunctional organopolysiloxane | 60 to 85 |
| High viscosity liquid difunctional organopolysiloxane | 10 to 30 |
| Incompatible organopolysiloxane resin | 5 to 20 |

In preparing the polishes, other ingredients normally used in making polish compositions may be incorporated or combined with the aforementioned three essential ingredients. Thus, one may make emulsions of the above mixture of ingredients with water employing emulsifying agents ordinarily used for the purpose. The amount of water used may be varied widely and may range from about 2 to 15 times the weight of the mixture of organopolysiloxanes, namely, the low and high viscosity organopolysiloxanes and the incompatible organopolysiloxane resin.

Various liquid solvents such as hydrocarbons, ethers, chloro-substituted hydrocarbons and mixtures thereof, etc., may be added to polish formulations, either with or without water in the formulation. Among such solvents which when used may comprise, for instance, from about 10 to 90% or higher of the total formulation, include liquid hydrocarbons, such as naphtha, mineral spirits (such as Stoddard solvent), etc.; chloro-substituted hydrocarbons such as carbon tetrachloride, ethylene dichloride, perchloroethylene, trichloroethylene, etc.; ethers and ketones, for example, ethyl hexyl ether, methyl ethyl ketone, etc. When employing petroleum distillate solvents, it is desirable that they preferably have an aniline point within the range of about $-30°$ C. to $85°$ C., and in addition advantageously possess a distillation range within a range of from about $80°$ C. to $232°$ C. Distillation ranges below $80°$ C. result in too rapid a volatilization of the solvent for most applications and do not allow sufficient spreading and covering with the coating composition. If this distillation temperature is above $323°$ C., volatization of solvent is too slow and results in retardation of drying of the polish wihch necessitates the lapse of prolonged periods before subsequent buffing may be satisfactorily conducted.

Various waxes may be added to formulations incorporating the above-mentioned ingredients. The wax is advantageously present, by weight, in an amount equal to from 0.25 to 8 parts of the wax per part of the mixture of organopolysiloxanes mentioned above. The instant invention is without restriction as to the type of polishing wax employed, although one may use mineral waxes as a class such, for example, as paraffin wax, which is meant to include microcrystalline and oxidized paraffins, montan wax, ozokerite, etc.; vegetable wax as a class as, for example, carnauba wax, candelilla wax, ouricury, palm wax, etc.; and animal waxes, for example, beeswax, whale wax, etc.

Mild abrasives may also be employed in certain formulations in order to obtain improved cleaning characteristics. These finely divided abrasives which may comprise from 5 to 15% or more, by weight, of the entire formulation may include, for instance, diatomaceous earth, amorphous silica, tripoli, talc, etc.

If desired, combined emulsifying and bodying agents such as gum tragacanth, gum arabic, bentonite, locust bean gum, starch, albumen, karaya gum, Irish moss, water colloidal methyl cellulose (sodium carboxymethyl cellulose), etc., may be used.

Water-soluble emulsifying agents and wetting agents may be used, such as sulfates of long chain alcohols such as dodecanol up to octadecanol, sulfonated amide and ester derivatives, sulfonated aromatic and mixed alkyl aryl sulfonate derivatives, esters of fatty acids such as ricinoleic acid ester sorbitol, and petroleum sulfonates of $C_{10}$ to $C_{20}$ length, combinations of oleic acid and morpholine, etc. The non-ionic emulsifying agents, such as the ethylene oxide condensation product of alkylated phenols, may also be used.

A wax polish formulation range which has been found useful is one which has the following general formulation, which includes formulations which are substantially free of water and thus not requiring an emulsifying agent:

| | |
|---|---|
| A low viscosity trimethylsiloxy endblocked dimethylpolysiloxane | 20 to 60 parts. |
| A high viscosity trimethylsiloxy endblocked dimethylpolysiloxane | 2.5 to 20 parts. |
| A methylpolysiloxane resin | 2 to 20 parts. |
| Hydrocarbon solvent | 100 to 900 parts. |
| Emulsifying agent | 0 to 30 parts. |
| A bodying agent such as sodium carboxy methyl cellulose | 1 to 10 parts. |
| Water | 0 to 1000 parts. |
| Wax | 0 to 45 parts (e. g., from 15 to 45 parts). |
| Finely divided abrasive (for example, diatomaceous earth) | 25 to 300 parts. |

In preparing the above polish, one advantageously blends the three organopolysiloxanes in the solvent which should be a solvent for all three of the organopolysiloxanes employed in the practice of the present invention. Thereafter, the emulsifying agent is added and the bodying agent, preferably dissolved in water, is added to the organopolysiloxane solution with agitation. After a satisfactory emulsion has been obtained, the finely divided abrasive is incorporated and the entire mixture stirred well until a stable mixture of ingredients is obtained. When incorporating a wax in the above formulation which may be present, by weight, in an amount equal to from about 1 to 5 parts, using the other ingredients mentioned in the above formulation, and which will give the products superior resistance to water spotting and back wetting, it is advantageous to melt the wax into the blend of the silicone in the solvent prior to continuing with the preparation of the polishing mixture.

It was entirely unexpected and in no way could have been predicted that a polish containing a combination of the high and low viscosity organopolysiloxanes together with the incompatible organopolysiloxane resin would have the advantages mentioned above. Thus, I found that when the organopolysiloxane resin was added alone in a formulation containing only the low viscosity liquid organopolysiloxane, the resin imparted gumminess and drag on rub-out. The use in polish formulations of only the high viscosity fluids without the low viscosity organopolysiloxane and without the organopolysiloxane resin imparted a smeary appearance to the polish. It was found that the organopolysiloxane resin and the high viscosity difunctional liquid organopolysiloxane appeared to complement one another and neither undesirable drag from the resin nor smear from the high viscosity polymer was apparent.

In order that those skilled in the art may better understand how the present invention may be practiced, the following examples are given by way of illustration and not by way of limitation. All parts are by weight.

The low viscosity difunctional organopolysiloxane employed was a trimethylsiloxy end-blocked polydimethylsiloxane having the formula

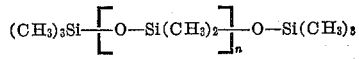

where $n$ is an integer sufficiently low to give a viscosity of about 300 centipoises at around 25° C., this material being sold by General Electric Company under the name of SF-96 fluid. The high viscosity difunctional organopolysiloxane used in the following examples was a trimethylsiloxy end-blocked polydimethylsiloxane corresponding to the same formula as above with the exception that $n$ was an integer large enough to give a high molecular weight product having a viscosity of 10,000 centipoises at around 25° C., this material being sold by General Electric Company as Viscasil 10,000 silicone fluid.

The incompatible organopolysiloxane resin employed in the following formulations was a methyl phenylpolysiloxane obtained by cohydrolyzing a mixture of ingredients composed of methyltrichlorosilane, phenyltrichlorosilane, dimethyldichlorosilane, and diphenyldichlorosilane, in such a ratio that there was present about 1.7 total methyl and phenyl groups per silicon atom. This resin was used in the form of an 80% solids toluene solution.

The wax used was Cardis 319 wax which was oxidized micro-crystalline synthetic wax having a melting point of about 180–185° F.

The hydrocarbon solvent used was "Amsco Super Naphtholite Mineral Spirits" made by American Mineral Spirits Company, 230 North Michigan Avenue, Chicago, Illinois, and had an API gravity at 60° F. of 59.6, a specific gravity at 60° F. of 0.7405, at 60° F. it weighed 6.164 lbs. per gallon and an initial boiling point of 250° F. and a final boiling point of 293° F. It had a Kauri butanol number of 33.0 and an aniline point of about 140° F. This solvent had sufficient volatility to dry in a reasonably short time after the polishing composition had been applied and was capable of dissolving at least a portion of the wax where it was used at ordinary temperatures, and of dissolving the silicone fluid, as well as being a solvent for some of the other organic additives, such as the emulsifying agent.

EXAMPLE 1

In this example, various formulations were prepared using in one instance only the low viscosity difunctional methylpolysiloxane; in another instance using only the high viscosity difunctional methylpolysiloxane; in still a further instance using the low viscosity and high viscosity difunctional organopolysiloxanes; in a further instance using a low viscosity difunctional methylpolysiloxane with the incompatible methyl phenylpolysiloxane resin described above; and finally using all three ingredients, namely, the low and high viscosity methylpolysiloxanes, and the incompatible methyl phenylpolysiloxane resin. In general, all three organopolysiloxanes were blended with the mineral spirits, the oleic acid was added, and a blend composed of sodium carboxy methyl cellulose in water and the morpholine were added to the blend of the silicones while effecting agitation of the mixture of ingredients. Thereafter, the finely divided abrasive, specifically diatomaceous earth, was added and the entire mixture of ingredients stirred until a homogenous polishing formulation was obtained. The following Table I shows the various formulations prepared in this example.

Table I

| Ingredient | Formulations (Ingredients in Parts by Weight) | | | |
|---|---|---|---|---|
| | A | B | C | D |
| Low viscosity methylpolysiloxane | 5 | 4.75 | 4.5 | 4.25 |
| High viscosity methylpolysiloxane | | | 0.5 | 0.5 |
| Incompatible methyl phenylpolysiloxane resin | | 0.25 | | 0.25 |
| Morpholine | 0.2 | 0.2 | 0.2 | 0.2 |
| Oleic acid | 0.8 | 0.8 | 0.8 | 0.8 |
| Mineral spirits | 15.0 | 15.0 | 15.0 | 15.0 |
| Water | 68.6 | 68.6 | 68.6 | 68.6 |
| Sodium carboxymethyl cellulose | 0.4 | 0.4 | 0.4 | 0.4 |
| Diatomaceous earth (snow floss) | 10.0 | 10.0 | 10.0 | 10.0 |

The above formulations were applied to a metal panel containing a baked black alkyd enamel surface and thereafter each surface was buffed with the same number of strokes and the appearance and ease of rub-out determined in each case. The film using formulation A was smeary and showed poor luster; by rubbing one's finger across the surface, undesirable streaking occurred which was difficult to remove by subsequent buffing. The surface made with formulation B showed somewhat improved color depth as compared to the surface using formulation A, but again the film was smeary and there was a tendency to drag more in the rub-out effort than when using formulation A. The polish made with formulation C showed poor color depth and bad smeariness. In many instances, there were indications that a continuous film was not being obtained and a slight touch of the finger caused smearing of the film and gave a particularly undesirable appearance to the surface. The surface polished with formulation D and subsequently buffed showed deep color effect, no apparent smeariness, and no noticeable drag in rub-out compared to the formulations previously tried. The improved color depth obtained by using formulation D was evidenced by the fact that there was no haze or fogginess in the polished surface as was the case using formulations A to C, and its clarity of reflected image was superior to the surfaces coated with the other polish formulations.

EXAMPLE 2

A polish formulation was prepared similarly as was done in Example 1, incorporating this time a synthetic oxidized microcrystalline wax identified as Cardis 319. The formulation for this polish was as follows:

| | |
|---|---|
| Low viscosity methylpolysiloxane | 3.0 |
| High viscosity methylpolysiloxane | 0.5 |
| Incompatible methyl phenylpolysiloxane resin (80% silicone) | 0.5 |
| Cardis wax | 319 |
| Mineral spirits | 20.0 |
| Oleic acid | 0.8 |
| Morpholine | 0.2 |
| Sodium carboxymethyl cellulose | 0.6 |
| Water | 61.4 |
| Diatomaceous earth | 10.0 |

This polish was applied to the same baked black enamel surface used in the tests described in Example 1 and buffed lightly to obtain a surface which showed extremely good color depth and gloss without any evidence whatsoever of fogginess or haze. This polish also effected coverage of small scratches which were in the enamel surface prior to application of the polish so that, after a few polishing strokes, these scratches were barely discernible to the naked eye. The surface dried rapidly and the finger could be rubbed over the surface with very little indication, if any, of smearing. The results in using this formulation were superior to the results obtained using presently commercially available wax-silicone polishes on the market of similar formulation with the exception that the high viscosity methylpolysiloxane and the incompatible methyl phenylpolysiloxane resin were omitted. When using the commercially available polishes, the scratch coverage was decidedly inferior and there was a slight haze existing on the polished surface.

EXAMPLE 3

In this example, polish formulations were prepared in which the same mineral spirits, low viscosity methylpolysiloxane, the high viscosity methylpolysiloxane, and the incompatible methyl phenylpolysiloxane resin described in the preparation of the polish formulations in Example 1 were employed in the present example using the proportions of ingredients shown in the following Table II:

*Table II*

| Ingredient | Formulations (Ingredients in parts by weight) | | |
|---|---|---|---|
| | E | F | G |
| Low viscosity methylpolysiloxane | 5.0 | 4.0 | 3.5 |
| High viscosity methylpolysiloxane | | 1.0 | 0.5 |
| Incompatible methyl phenylpolysiloxane resin | | | 1.0 |
| Morpholine | 0.2 | 0.2 | 0.2 |
| Oleic acid | 0.8 | 0.8 | 0.8 |
| Sodium carboxymethyl cellulose | 0.4 | 0.4 | 0.4 |
| Mineral spirits, Amsco | 10.0 | 10.0 | 10.0 |
| Diatomaceous earth (Snow Floss) | 10.0 | 10.0 | 10.0 |
| Water | 73.6 | 73.6 | 73.6 |

Steel panels coated with a baked light blue alkyd enamel were polished twice with each coating formulation, employing equivalent application and polishing conditions. After the second polishing, each polished panel was subjected to a weatherometer test in an Atlas Twin-arc weatherometer employing the usual ASTM conditions whereby both ultraviolet light and water were allowed to strike the polished surface of each panel. The gloss readings of the panels before subjecting the latter to the weatherometer test and after 200 hours in the weatherometer test were read on a Gardner gloss meter. As a control, gloss readings were also taken of an alkyd resin-coated steel panel which was not coated and polished with any of formulations E, F and G. The readings on the Gardner gloss meter showed that after 200 hours in the weatherometer, the unpolished blank showed a large decrease in color retention. The panel coated with polish formulation G (containing the high and low viscosity methylpolysiloxanes and the incompatible methyl phenylpolysiloxane resin) had a gloss which was 15% greater than the gloss shown by the Gardner gloss meter for the panels coated with polish formulations E and F, and about 33⅓% better than the unpolished panel. The above results were obtained despite the fact that the initial gloss readings on the panels prior to the weatherometer test were essentially identical.

The three polish formulations described above in Example 3 and in Table II were subjected to further testing in the weatherometer until a total of 343 hours had expired. This was equivalent to 1 year's aging under normal weather conditions; again the gloss was determined in the same manner as was done above. In addition, the gloss of the surfaces was also determined after washing the surfaces with soap and water to remove dirt accumulated during the testing in the weatherometer for 343 hours. The results of these tests were as follows.

The surface coated with formulation E showed a gloss of 22 on the Gardner gloss meter and a gloss of 30 after washing. The surface coated with formulation F showed a gloss of 24 and a gloss of 32 after washing. The surface coated with formulation G showed a gloss after 343 hours of 29, and a gloss reading of 39 after washing with the soap and water. It is thus apparent that the surface coated with formulation G, after washing with soap and water and being subjected to what is considered a one-year use under normal weathering conditions, exhibited 30% better gloss than that of the surface coated with formulation E, and about 22% better gloss than that of the surface coated with formulation F. It is of inerest to note that the gloss reading of the surface coated with formulation G was about 33% better than the control panel which contained no polish at all and which was subjected to the same tests as the other coated panels.

One of the unexpected results obtained using coating compositions of my invention has been the ability to retard oxidation (that is, rusting) of ferrous surfaces, especially those which are completely unprotected from oxidizing influences as, for example, free of any Bonderizing or phosphatizing treatments usually accorded ferrous surfaces to prevent oxidation of the surface. In particular, I have found that a formulation comprising a mixture of the above-described ingredients, mainly the high and low viscosity difunctional organopolysiloxanes, an incompatible organapolysiloxane resin and a wax, is able to keep to a minimum the rusting of unprotected ferrous surfaces, whereas the use of any of the ingredients separately or in combinations other than those employed in the practice of my invention gives greatly inferior rust resistance. The following example illustrates the marked improvements obtained in applications of this type.

EXAMPLE 4

A coating composition essentially similar to that described in Example 2, with the exception that about 200 parts carnauba and 200 parts Cardis wax were employed in place of the Cardis wax alone, was applied to the surface of a steel panel which was otherwise unprotected by any rust-retarding coating. For comparison, similar steel panels were coated with other formulations outside the scope of the formulation described in Example 2. These coating compositions were as follows, in which descriptions only the wax and organopolysiloxane ingredients are recited, it being understood that the remainder of the coating formulation (unless otherwise stated) was the same as in Example 2.

a. Carnauba wax, Cardis wax, and low viscosity methylpolysiloxane
b. Low viscosity methylpolysiloxane (wax omitted)
c. Low viscosity methylpolysiloxane and high viscosity methylpolysiloxane (wax omitted)
d. Low viscosity and high viscosity methylpolysiloxanes, together with incompatible methyl phenylpolysiloxane resin (wax omitted)
e. A commercially available polish composed of wax (exact composition unknown) and the low viscosity methylpolysiloxane
f. A commercially available polish free of any silicone and containing only a wax as the film-forming ingredient Each of the above-coated panels, as well as a sample panel free of any coating, was exposed to outdoor weather for thirty days. At the end of this time, the percent of area rusted was qualitatively estimated. Examination of the panel coated with the formulation described in Example 2 showed that about 10% of the surface area was rusted. All the other panels coated with the various formulations recited above, as well as the uncoated panel, showed from 80 to 100% of the surface area had become rusted. The sole exception was the specifically prepared sample composed of Cardis and carnauba waxes and the low viscosity methylpolysiloxane (formulation A), which showed that about 40% of the surface area was rusted. The unexpected and outstanding rust-retarding effect of the formulation described in Example 2 is believed clearly evident from the above results.

It will, of course, be apparent to those skilled in the art that other formulations within the scope of the invention may be employed without departing from the spirit of the invention. Thus, one may use other types of low viscosity and high viscosity organopolysiloxanes within the ranges and proportions specified above, as well as other incompatible organopolysiloxane resins. It is essential that the resin used be incompatible with both the low and high viscosity organopolysiloxanes. There are resins which are compatible with these two types of organopolysiloxanes and which will not give the results when one employs an incompatible organopolysiloxane resin.

Additional examples of incompatible organopolysiloxane resins which may be employed are those obtained, for instance, (a) by hydrolyzing a blend consisting of from 10 to 15 mol percent methyltrichlorosilane, 20 to 25 mol percent phenyltrichlorosilane, 35 to 40 mol percent dimethyldichlorosilane, and 25 to 30 mol percent diphenyldichlorosilane; (b) by cohydrolyzing a mixture of organochlorosilanes composed of, by weight, 35 to 40 parts dimethyldichlorosilane, 50 to 60 parts phenyltrichlorosilane, and 5 to 10 parts diphenyldichlorosilane; (c) by cohydrolyzing a mixture composed of 80 to 95 mol percent methyltrichlorosilane, and 5 to 15 mol percent dimethyldichlorosilane, etc.

Other types of waxes and other additives normally employed in combination with polishing materials or liquid polishes may be used. In this connection, solvents other than those used in the examples above, together with different types of waxes, many examples of which have been given above, may be employed within the scope of the invention. Abrasives may be added or omitted as desired, depending on the application for the polish formulation. Abrasives are omitted when used on surfaces such as furniture, etc. The abrasive is usually employed when the polish is to be used on more rugged surfaces, such as the surfaces of cars, etc., where a combined cleaning and polishing action is desired. The mild abrasive, many examples of which have also been given, may be incorporated in varying amounts.

Where waxes are omitted from the formulation, the liquid polishing composition of this invention may be easily applied to surfaces to be polished and provided with a protective coating. In the instance where particles of wax are used, generally, the polishing composition is agitated, such as by shaking, until the dispersed particles of excess wax have been substantially uniformly distributed. Thereafter, the composition is applied to the surface by means of a cloth or the like and permitted to dry. On drying, the finish will be somewhat dull and contain the powdery wax particles that were in the suspension. After drying is complete, a dry cloth is used to remove excess wax and polish, and buff the surface to bring out the luster. After this has been done, the surface will have a high degree of luster and the ingredients of the composition will be spread uniformly over the surface.

It will, of course, be apparent to those skilled in the art that the proportions of ingredients may be varied widely and wax may be included or omitted as desired. In the instance where a wax is incorporated in the formulation, a useful range of ingredients of the essential materials, namely, the high and low viscosity organopolysiloxanes, the incompatible organopolysiloxane resin, the wax, and the solvent and water, is as follows, where all parts are by weight:

| | Parts |
|---|---|
| Low viscosity organopolysiloxane | 20 to 60 |
| High viscosity organopolysiloxane | 2.5 to 20 |
| Incompatible organopolysiloxane resin | 2 to 20 |
| Wax | 15 to 45 |
| Hydrocarbon solvent | 100 to 900 |
| Water | 0 to 1000 |

What I claim as new and desire to secure by Letters Patent of the United States is:

1. A polish composition containing, by weight, as essential ingredients (1) from 60 to 85 parts of a liquid linear organopolysiloxane having a viscosity of from 50 to 1000 centipoises, (2) from 10 to 30 parts of a liquid linear organopolysiloxane having a viscosity of from 5,000 to 100,000 centipoises, the viscosities of (1) and (2) being measured at about 25° C. and the organopolysiloxanes of (1) and (2) corresponding to the general formula $R_{(2a+2)}Si_aO_{a-1}$ where R is a monovalent organic radical attached to silicon by a Si—C linkage, and $a$ is a whole number equal to at least 3, and (3) from 5 to 20 parts of an organopolysiloxane resin incompatible with the aforementioned low and high viscosity polymers, the organic groups of said organopolysiloxane resin being hydrocarbon groups attached directly to silicon by carbon-silicon linkages and containing an average of from 1.1 to 1.8 hydrocarbon groups per silicon atom.

2. A polish composition containing, by weight, as essential ingredients (1) from 60 to 85 parts of a liquid linear methylpolysiloxane having a viscosity of from 50 to 1,000 centipoises, (2) from 10 to 30 parts of a liquid linear methylpolysiloxane having a viscosity of from 5,000 to 100,000 centipoises, the viscosities of (1) and (2) being measured at about 25° C. and the methylpolysiloxanes of (1) and (2) have a methyl-to-silicon ratio in excess of 2, the methyl groups being attached to silicon by Si—C linkages, and (3) from 5 to 20 parts of a methyl phenylpolysiloxane resin incompatible with the aforementioned low and high viscosity methylpolysiloxanes, the methyl and phenyl groups being attached directly to silicon by carbon-silicon linkages and there being present from 1.1 to 1.8 total methyl and phenyl groups per silicon atom in the methyl phenylpolysiloxane resin.

3. A polish composition containing, by weight, as essential ingredients (1) from 20 to 60 parts of a liquid linear organopolysiloxane having a viscosity of from 50 to 1,000 centipoises, (2) 2.5 to 20 parts of a liquid linear organopolysiloxane having a viscosity of from 5,000 to 100,000 centipoises, the viscosities of (1) and (2) being measured at about 25° C. and the organopolysiloxanes of (1) and (2) corresponding to the general formula $R_{(2a+2)}Si_aO_{a-1}$ where R is a monovalent organic radical attached to silicon by a Si—C linkage, and $a$ is a whole number equal to at least 3, (3) from 2 to 20 parts of an organopolysiloxane resin incompatible with the aforementioned low and high viscosity organopolysiloxanes, the organic groups of said organopolysiloxane resin being hydrocarbon groups attached directly to silicon by carbon-silicon linkages and containing an average of from 1.1 to 1.8 hydrocarbon groups per silicon atom, (4) from 100 to 900 parts of a hydrocarbon solvent, (5) up to 1,000 parts water, and (6) from 15 to 45 parts of a wax.

4. A polish composition containing, by weight, as essential ingredients (1) from 20 to 60 parts of a liquid linear methylpolysiloxane having a viscosity of from 50 to 1,000 centipoises, (2) from 2.5 to 20 parts of a liquid linear methylpolysiloxane having a viscosity of from 5,000 to 100,000 centipoises, the viscosities of (1) and (2) being measured at about 25° C. and the methylpolysiloxanes of (1) and (2) have a methyl-to-silicon ratio in excess of 2, the methyl groups being attached to silicon by Si—C linkages, (3) from 2 to 20 parts of methylphenylpolysiloxane resin incompatible with the aforementioned low and high viscosity methylpolysiloxanes, the methyl and phenyl groups being attached directly to silicon by carbon-silicon linkages and containing an average of from 1.1 to 1.8 total methyl and phenyl groups per silicon atom, (4) from 100 to 900 parts of a hydrocarbon solvent, (5) up to 1,000 parts water, and (6) from 15 to 45 parts of a wax.

5. A polish composition comprising, by weight, (1) from 20 to 60 parts of a liquid linear methylpolysiloxane having a viscosity of from 50 to 1,000 centipoises, (2) from 2.5 to 20 parts of a liquid linear methylpolysiloxane having a viscosity of from 5,000 to 100,000 centipoises, the viscosities of (1) and (2) being measured at about 25° C. and the methylpolysiloxanes of (1) and (2) having a methyl-to-silicon ratio in excess of 2, the methyl groups being attached to silicon by Si—C linkages, (3) from 2 to 20 parts of a methyl phenylpolysiloxane resin incompatible with the aforementioned two methylpolysiloxane liquids, the methyl and phenyl groups being attached directly to silicon by carbon-silicon linkages and there being present an average of from 1.1 to 1.8 total methyl and phenyl groups per silicon atom, (4) from 15 to 45 parts of a microcrystalline wax, (5) up to 1,000 parts water, (6) from 25 to 300 parts of a finely divided abrasive, and (7) from 100 to 900 parts of a hydrocarbon solvent.

6. A polish composition comprising, by weight, (1) from 20 to 60 parts of a liquid linear methylpolysiloxane having a viscosity of from 50 to 1,000 centipoises, (2) from 2.5 to 20 parts of a liquid linear methylpolysiloxane having a viscosity of from 5,000 to 100,000 centipoises, the viscosities of (1) and (2) being measured at about 25° C. and the methylpolysiloxanes of (1) and (2) having a methyl-to-silicon ratio in excess of 2, the methyl groups being attached to silicon by Si—C linkages, (3) from 2 to 20 parts of a methylpolysiloxane resin incompatible with the liquid difunctional methylpolysiloxanes of (1) and (2), the methyl groups being attached directly to silicon by carbon-silicon linkages and there being present an average of from 1.1 to 1.8 methyl groups per silicon atom, (4) from 15 to 45 parts of a microcrystalline wax, (5) up to 1,000 parts water, (6) from 25 to 300 parts of a finely divided abrasive, and (7) from 100 to 900 parts of a hydrocarbon solvent.

References Cited in the file of this patent

UNITED STATES PATENTS 2,588,366    Dennett _____ Mar. 11, 1952